United States Patent
Neu et al.

(10) Patent No.: US 6,770,120 B2
(45) Date of Patent: Aug. 3, 2004

(54) RADIAL ADSORPTION GAS SEPARATION APPARATUS AND METHOD OF USE

(75) Inventors: Bernard Thomas Neu, Lancaster, NY (US); James Smolarek, Boston, NY (US); Mark Thomas Emley, Boston, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 10/135,562

(22) Filed: May 1, 2002

(65) Prior Publication Data

US 2003/0205130 A1 Nov. 6, 2003

(51) Int. Cl.[7] .......................................... B01D 53/053
(52) U.S. Cl. ............................ 95/96; 95/117; 95/130; 95/139; 96/130; 96/131; 96/132; 96/143
(58) Field of Search .................... 95/96–98, 100–105, 95/130–132, 139, 108, 143, 144, 154

(56) References Cited

U.S. PATENT DOCUMENTS

| | | | | |
|---|---|---|---|---|
| 2,626,675 A | * | 1/1953 | Maher | 96/144 |
| 3,064,819 A | * | 11/1962 | Jones | 210/266 |
| 3,204,388 A | * | 9/1965 | Asker | 95/119 |
| 4,544,384 A | * | 10/1985 | Metschl et al. | 96/130 |
| 4,698,072 A | | 10/1987 | Rohde et al. | 55/31 |
| 5,133,784 A | * | 7/1992 | Boudet et al. | 95/100 |
| 5,232,479 A | * | 8/1993 | Poteau et al. | 96/131 |
| 5,324,159 A | * | 6/1994 | Nowobilski et al. | 414/301 |
| 5,370,728 A | | 12/1994 | LaSala et al. | 95/101 |
| 5,431,716 A | * | 7/1995 | Ebbeson | 96/125 |
| 5,441,559 A | * | 8/1995 | Petit et al. | 96/125 |
| 5,593,475 A | * | 1/1997 | Minh | 95/123 |
| 5,632,804 A | * | 5/1997 | Schartz | 95/101 |
| 5,716,427 A | * | 2/1998 | Andreani et al. | 95/90 |
| 5,759,242 A | * | 6/1998 | Smolarek et al. | 96/149 |
| RE35,913 E | * | 10/1998 | Hay et al. | 95/96 |
| 5,912,424 A | | 6/1999 | Judkins et al. | 95/143 |
| 6,059,863 A | * | 5/2000 | Monereau et al. | 96/152 |
| 6,086,659 A | * | 7/2000 | Tentarelli | 96/131 |
| 6,152,992 A | * | 11/2000 | Gemmingen | 95/96 |
| 6,276,408 B1 | * | 8/2001 | Lehman | 141/100 |
| 6,506,234 B1 | * | 1/2003 | Ackley et al. | 95/96 |

FOREIGN PATENT DOCUMENTS

EP       0526343 A1    2/1993

* cited by examiner

Primary Examiner—Robert H. Spitzer
(74) Attorney, Agent, or Firm—David M. Rosenblum (57) ABSTRACT

An apparatus includes a vessel and a radial adsorption bed within the vessel and either an axial adsorption bed for a storage tank within the inner diameter of the radial adsorption bed. In one example, the radial adsorption bed surrounds an axial adsorption bed. A process that can be conducted in the vessel includes directing a gas mixture across the radial adsorption bed, thereby causing adsorption of at least a portion of a gas component present in the gas mixture and producing partially purified product. The partially purified gas is directed through the axial adsorption bed, thereby causing further purification of the partially purified gas and producing product gas. In another example, the radial adsorption bed surrounds a storage tank. The storage tank can be employed to store a gas generated or used in a separation process conducted in the radial adsorption bed. For instance, the storage tank can be employed to store product gas or void gas generated in a vacuum/pressure swing adsorption process.

23 Claims, 12 Drawing Sheets

RADIAL ADSORPTION GAS SEPARATION APPARATUS AND METHOD OF USE

BACKGROUND OF THE INVENTION

Pressure swing adsorption (PSA) and vacuum/pressure swing adsorption (VPSA) processes generally employ an adsorbent material that selectively removes at least one component from a gas mixture. PSA and VPSA systems are widely used in air separation applications. Both axial and radial adsorbent bed designs can be employed.

PSA and VPSA processes are cyclic, with each cycle including adsorption and desorption steps. Rapid cycles are desired for increased productivity, and have been made possible by advances in adsorbent technology and improvements in bed design. Radial bed configurations, for example, provide relatively short bed lengths and often are preferred in larger gas separation plants.

To minimize adsorbent attrition and/or fluidization, and to reduce pressure drop, radial beds generally are operated at low gas velocities. To compensate, designs that maximize the overall inlet area to the bed, e.g. the outer radial bed diameter, are preferred. In combination with maintaining a relatively short bed length to be traversed by the mixture being separated, the resulting vessel design has a relatively large central void space.

Space that is not utilized results in less compact plant layouts. In addition, increased void vessel space causes losses in VPSA processes as relatively large volumes of void gas need to be evacuated, leading to longer cycle times.

In many cases, VPSA plants include two or more separate adsorption vessels. Extensive piping and valve systems often are required to connect them and to direct gas flows. Designs that include two adsorption zones or beds stacked in a common housing also exist but generally require increased vertical vessel dimensions and relatively large vessel void spaces for gathering and redirecting gas streams.

Furthermore, adsorption beds generally are connected to external gas storage tanks which need to be sited, installed and maintained and which, along with their valve and piping requirements, add to the overall capital and operating costs of VPSA plants.

Therefore, a need exists for adsorption vessels that minimize or eliminate the above-mentioned problems.

SUMMARY OF THE INVENTION

The invention generally is directed to apparatus used in gas adsorption processes. More specifically, the invention is directed to apparatus that includes a vessel, a radial adsorption bed within the vessel, and either an inner adsorption bed or a storage tank within an inner diameter of the radial adsorption bed. The inner adsorption bed is either an axial adsorption bed or an inner radial adsorption bed.

One embodiment of the invention includes a vessel, having a vessel side wall, an axial adsorption bed within the vessel and a radial adsorption bed surrounding the axial adsorption bed. An inner channel is defined by the axial bed and an inner porous wall of the radial adsorption bed, and an outer channel is defined by an outer porous wall of the radial adsorption bed and the vessel side wall. In a preferred embodiment, the inner channel is in fluid communication with the axial adsorption bed. The radial adsorption bed and the axial adsorption bed contain at least one adsorbent material.

Another embodiment of the invention includes a vessel that has an inner radial adsorption bed surrounded by an outer radial adsorption bed. An outer channel is defined between the outer porous wall of the outer radial adsorption bed and a vessel side wall. In one embodiment, a common porous wall separates the outer radial adsorption bed from the inner adsorption bed and an inner channel is defined by the inner diameter of the inner adsorption bed. Alternatively, the outer radial adsorption bed can be separated from the inner radial adsorption bed by an annular channel.

The vessel can be employed in a method of the invention for separating a product gas from a gas mixture. The method includes the steps of directing a gas mixture across the outer radial adsorption bed, thereby causing at least a portion of a gas component of the gas mixture to be adsorbed by the radial bed and directing partially purified gas from the outer radial bed to the inner adsorption bed, thereby causing further purification of partially purified gas and producing a product gas. In alternative embodiments, the inner adsorption bed is employed to separate a gas component from an independent gas stream or from the waste gas not adsorbed in the outer radial adsorption bed.

Another apparatus of the invention includes a vessel, a storage tank in the vessel and a radial adsorption bed surrounding the storage tank. An inner channel is defined by the storage tank and an inner porous wall of the radial adsorption bed and an outer channel is defined by an outer porous wall of the radial adsorption bed and a side wall of the vessel. The storage tank includes means for isolating the tank, for example a shut-off valve.

The vessel can be employed in a gas separation process during which a gas needed or generated during the process is stored in the storage tank. In one embodiment of the invention, the vessel is employed in an air separation process in which the storage tank is employed to store void gas, waste gas, or product gas. In a preferred embodiment, the method includes pressurizing with air a partially pressurized radial bed, thereby causing the radial bed to adsorb nitrogen. Oxygen that permeates the radial bed is directed to a product surge tank. The radial bed is partially depressurized, thereby releasing void gas (oxygen enriched) from the radial adsorption bed. The void gas is directed to an equalization tank. Nitrogen adsorbed in the radial adsorption bed is evacuated, after which oxygen from the product surge tank is directed to the radial adsorption bed, thereby desorbing nitrogen from the adsorption bed and purging the radial adsorption bed of nitrogen gas. Additional void gas from the equalization tank is then directed to the radial adsorption bed, thereby partially pressurizing the radial adsorption bed. The partially pressurized bed is then ready for another cycle.

The invention has numerous advantages. For example, the vessels of the invention have reduced void space, thereby minimizing the amount of void gas to be evacuated and reducing PSA or VPSA cycle time. In many cases, vessels of the invention can be fabricated inexpensively, by modifying existing vessels that already house a radial adsorption bed. The invention is compatible with compact VPSA plant designs and results in capital and operational cost reductions. By employing vessels of the invention, external storage tanks and/or separate adsorption beds can be eliminated, possibly along with some piping and valve requirements. Vessels that combine a central axial bed surrounded by a radial bed result in an increase in the overall vessel separation capacity, minimize overall vessel size and void space, and provide a simple arrangement for directing gas from one bed to the other. Locating tanks that contain flammable or explosive gases or tanks fabricated from UV sensitive materials within the central void space of a radial bed also eliminates the need for additional safety devices or UV protective tank enclosures. In addition, VPSA processes that recycle void gas and use product gas as a purge generally can provide improved product flow rate.

DETAILED DESCRIPTION OF THE INVENTION

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

The invention generally is directed to a gas separation apparatus and to a method of employing it. More specifically, the invention is related to a gas separation apparatus for PSA and VPSA processes.

Figure 1:
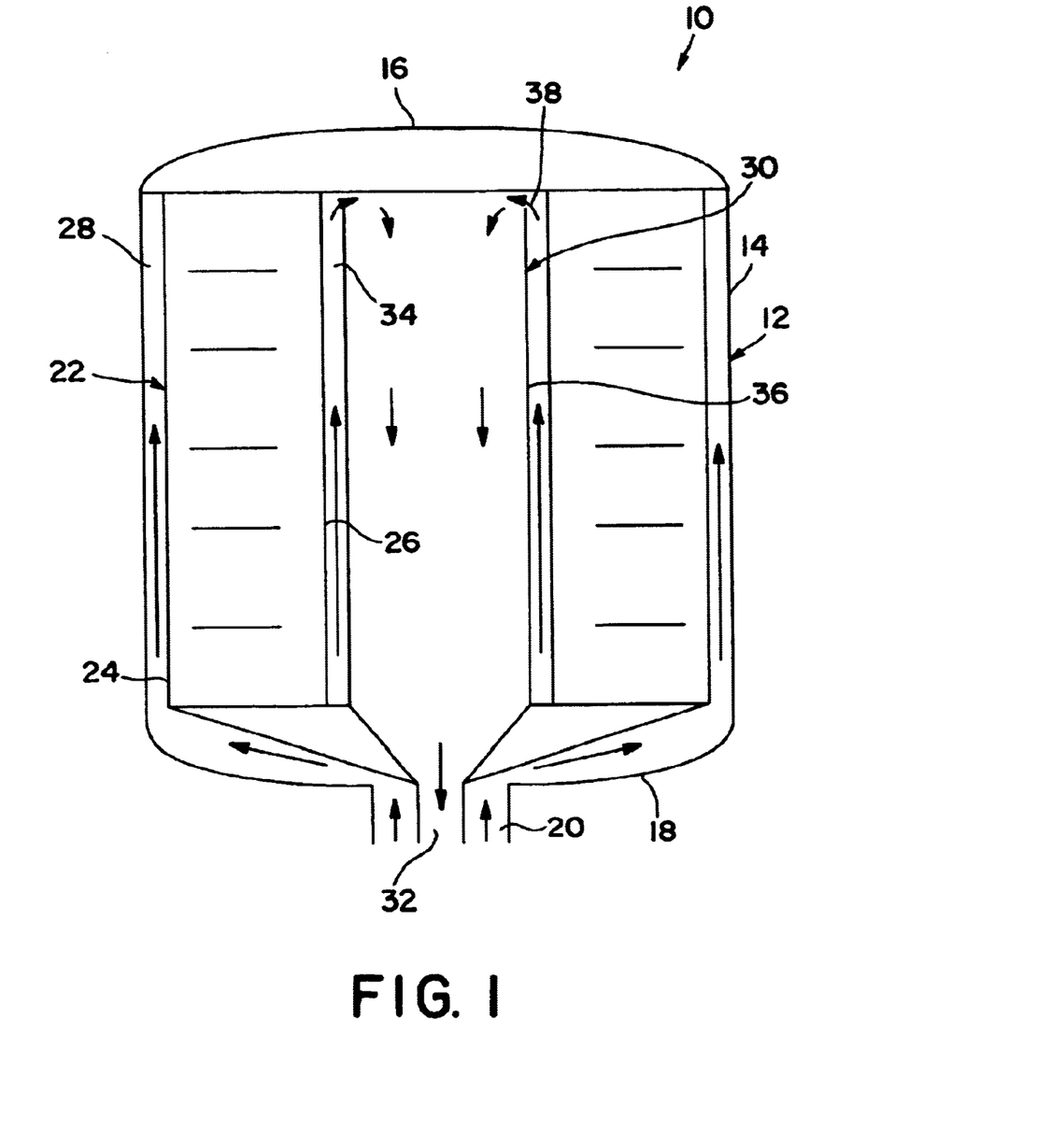
FIG. 1 is a schematic diagram of an apparatus of the invention that includes a vessel, an axial adsorption bed within the vessel and a radial adsorption bed surrounding the axial adsorption bed.

One embodiment of the invention, suitable for conducting PSA and VPSA processes, is shown in FIG. 1. Shown in FIG. 1 is gas separation apparatus 10, which includes vessel 12. Vessel 12 has vessel side walls 14, top vessel wall 16 and bottom vessel wall 18. In a preferred arrangement, bottom vessel wall 18 includes inlet 20. Inlet 20 also can be located at top vessel wall 16.

Vessel 12 is designed to withstand the pressure employed in the separation process conducted in the vessel. Examples of materials suitable for fabricating vessel 12 include carbon steel, stainless steel, fiberglass, rigid polymeric materials such as polyvinyl chloride (PVC) or combinations thereof. In one embodiment of the invention, stainless steel is used to construct parts of vessel 12 that come in contact with corrosive gases, such as, for instance, a wet carbon dioxide ($CO_2$) gas stream, while less expensive carbon steel can be employed to make other parts of vessel 12.

Radial adsorption bed 22 is contained within vessel 12. Radial adsorption beds (also referred to as annular beds) suitable for use in the present invention are known in the art. An example of a suitable radial bed design and its operation are described in U.S. Pat. No. 5,759,242, issued to Smolarek, et al., on Jun. 2, 1998, the teachings of which are incorporated herein by reference in their entirety.

Radial adsorption bed 22 includes outer porous wall 24 and inner porous wall 26. Outer porous wall 24 defines the outer diameter of radial bed 22. Inner porous wall 26 defines inner diameter of radial adsorption bed 22. Either or both porous walls can be screens. Outer channel 28 is defined by outer porous wall 24 and vessel side wall 14. Outer channel 28 is annular in shape.

Radial adsorption bed 22 includes a suitable adsorbent material. For a given gas mixture, the adsorbent selectively adsorbs one or more components, while the remaining component(s) permeate(s) through the adsorbent material. In a preferred embodiment, the adsorbent selectively adsorbs nitrogen from air, while oxygen permeates radial bed 22.

Adsorbents generally are particulate materials and are manufactured in bead, pellet or other suitable shapes. Adsorbents suitable for specific gas separation applications are known in the art. Examples include molecular sieves, such as zeolites and zeolite-like materials, carbon-based molecular sieves and others. Adsorbents suitable for air separation include, among others, zeolite 5A, 13X and lithium cation forms of zeolite X, e.g., LiX zeolites.

Generally, the adsorbent material is densely packed in radial adsorption bed 20. Means, not shown in FIG. 1, for loading adsorbent material into radial adsorption bed 20 are known in the art. In a preferred embodiment, radial adsorbent bed 22 is designed to accommodate the loading system described in U.S. Pat. No. 5,324,159, issued to Nowobilski, et al., on Jun. 28, 1994, the teachings of which are incorporated herein by reference in their entirety.

An example of a suitable radial adsorption bed is one constructed with an outer diameter of about 12 feet. Beds having an outer diameter as large as about 16' or as small as about 5' also can be employed. The thickness of the bed, i.e., the distance between outer porous wall 24 and the inner porous wall 26 generally is in the range between about 1' and about 4'.

Generally, design criteria for radial adsorption beds are based on the type of process to be conducted in the bed. For example, radial beds generally are constructed to have a ratio between an inlet surface area and an outlet surface area based on the feed composition and the anticipated amount of gas to be removed from the feed stream. If it is anticipated, for example, that 45% of the gas entering the bed will be removed in the adsorption step, then the outlet surface area of the radial bed will be about 45% smaller than the inlet surface area.

Vessel 12 also includes axial adsorbent bed 30. Axial adsorption bed 30 is surrounded by radial adsorption bed 22. Axial adsorbent bed 30 includes an adsorbent material that can be the same or different from the adsorbent material in radial bed 22. Outlet 32 is located at the lower end of axial adsorbent bed 30. Outlet 32 also can be located at upper end of axial adsorbent bed 30.

Means, not shown in FIG. 1, for loading adsorbent material in axial adsorbent bed 30 are known in the art. In a preferred embodiment, axial adsorbent bed 30 is designed to accommodate the loading system described in U.S. Pat. No. 5,324,159, issued to Nowobilski, et al., on Jun. 28, 1994.

Axial adsorption bed 30 is in fluid communication with inner channel 34 which is defined by inner porous wall 26 and by outer surface 36 of axial adsorption bed 30. Inner channel 34 is annular in shape. Fluid communication between inner channel 34 and axial adsorbent bed 30 is through opening 38. Opening 38 is located at the upper end of axial adsorbent bed 30. Alternatively, opening 38 also can be positioned at the bottom or at other points along the length of axial adsorbent bed 30.

Apparatus 10 can be employed in air separation applications and in other separation processes, such as, for example, capture of $CO_2$ from $H_2$ PSA tail-gas streams. Apparatus 10 also can be employed in the purification of recycled noble gas streams (e.g., He) from process applications. Apparatus 10 also can be used in process gas pre-purification applications, e.g., $H_2O$, $CO_2$, or hydrocarbon removal. $H_2$ capture from steam-methane reformer, e.g., $H_2$ PSA, also can be conducted by employing apparatus 10.

A gas mixture is fed, through inlet 20, to outer channel 28 and enters radial adsorption bed through outer porous wall 24. At least a portion of a gas component present in the gas mixture is adsorbed by radial bed 22 and partially purified product gas is obtained in inner channel 34. At least a portion of the partially purified gas flows upward through inner channel 34 to opening 38 and then downward through axial adsorption bed 30, where further purification takes place. For instance, a second portion of the gas component can be removed. Alternatively, a second component can be removed in axial bed 30. Product gas is obtained from outlet 32.

In one example, air is fed via inlet 20 to outer channel 28. Nitrogen is selectively adsorbed by adsorbent material, for example a LiX zeolite, in radial bed 22 and an intermediate product is collected in inner channel 34. The intermediate product generally has an oxygen purity ranging from about 80 to about 94 volume percent. The intermediate product is directed from inner channel 34, via opening 38 through axial bed 30 where remaining nitrogen impurity is selectively adsorbed and oxygen product is collected from outlet 32. The final product generally having a final $O_2$ purity higher than the intermediate purity.

Figure 2:
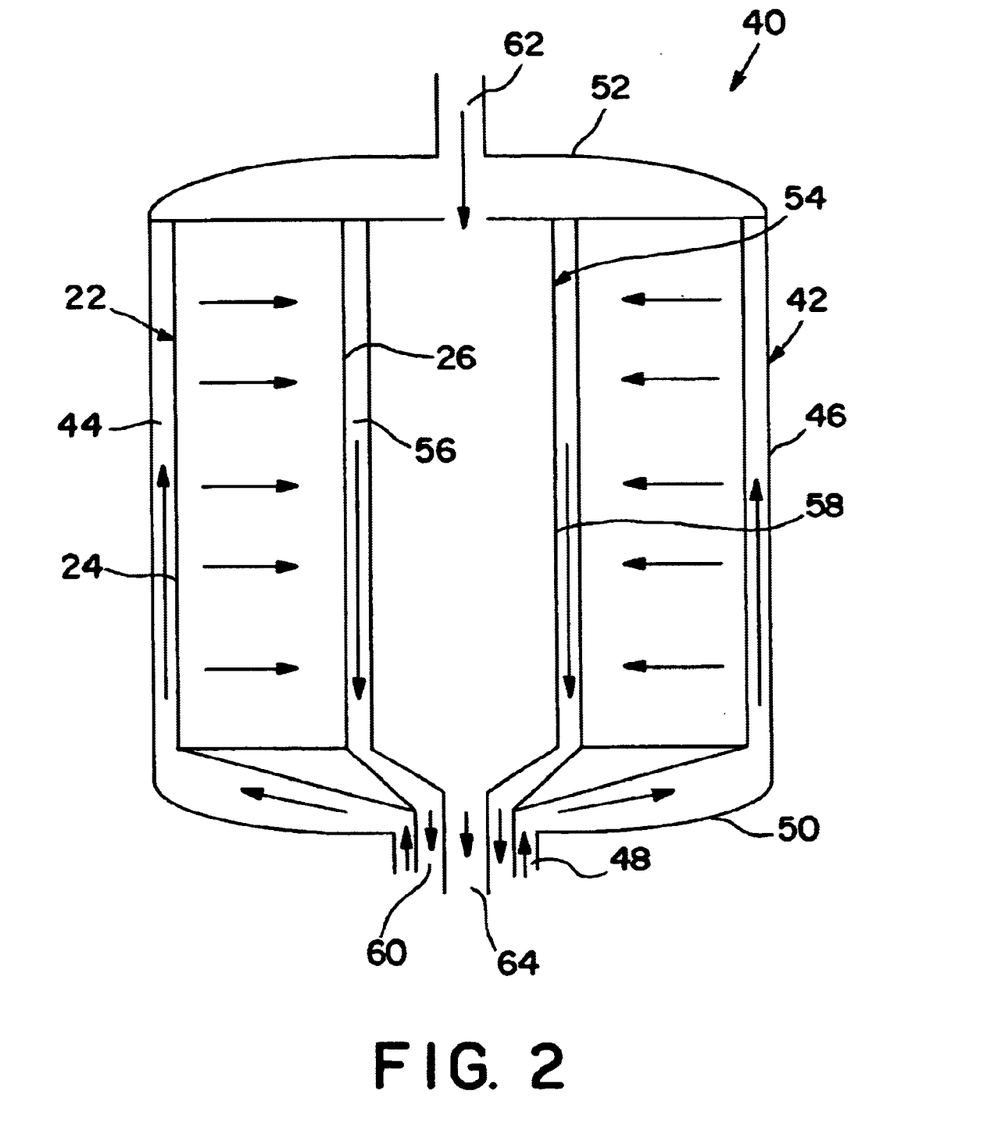
FIG. 2 is a schematic diagram of an apparatus of the invention that includes a vessel, an axial adsorption bed within the vessel and a radial adsorption bed surrounding the axial adsorption bed.

Another embodiment of the invention is shown in FIG. 2. Shown in FIG. 2 is apparatus 40 which includes vessel 42. Within vessel 42 is radial adsorption bed 22 having outer porous wall 24 and inner porous wall 26, essentially as described above. Outer channel 44 is defined by side vessel wall 46 and outer porous wall 24. Inlet 48 is located at bottom vessel wall 50 and is in fluid communication with outer channel 44. Alternatively, inlet 48 can be located at top vessel wall 52. Vessel 42 also includes axial adsorption bed 54. Axial adsorption bed 54 is surrounded by radial adsorption bed 22. Inner channel 56 is defined by inner porous wall 26 and outer surface 58 of axial adsorption bed 54. Inner channel 56 is in fluid communication with outlet 60. One end of inner channel 56 is closed off. Outlet 60 is located at bottom vessel wall 50. Alternatively, outlet 60 can be located at top vessel wall 52. Axial adsorption bed 54 has inlet 62 and outlet 64.

The apparatus shown in FIG. 2 can be employed to conduct independent separation processes. For example, a first gas mixture is fed, via inlet 62 to axial adsorption bed 54. At least a portion of a gas component present in the first gas mixture is adsorbed in axial bed 54 and a first gas product is collected at outlet 64. A second gas mixture is fed via inlet 48 and outer channel 44 to outer porous wall 24. At least a portion of a component present in the second gas mixture is adsorbed in radial adsorption bed 22 and a second product gas is collected from inner channel 56 via outlet 60.

In one embodiment of the invention, axial adsorption bed 54 is employed to remove water and/or other impurities or contaminants from a gas stream, for example during a pre-purification process. A gas stream is directed to axial adsorption bed 54. Water vapor and/or other impurities or contaminants are adsorbed in axial adsorbent bed 54 and pre-purified gas is collected at outlet 64. Suitable adsorbents that can be used in axial adsorption bed 54 to effect water vapor removal and/or removal of other impurities or contaminants are known in the art. Examples include, but are not limited to carbon zeolites, zeolite-like materials, activated aluminas, silica gel and others. Pre-purified gas is directed via inlet 48 and outer channel 44 to porous outer wall 24 and across radial adsorption bed 22. At least a portion of a gas component present in the pre-purified gas stream is adsorbed in radial adsorption bed 22. Product gas permeates through inner porous wall 26 into inner channel 56 and exits vessel 42 through outlet 60.

Figure 3:
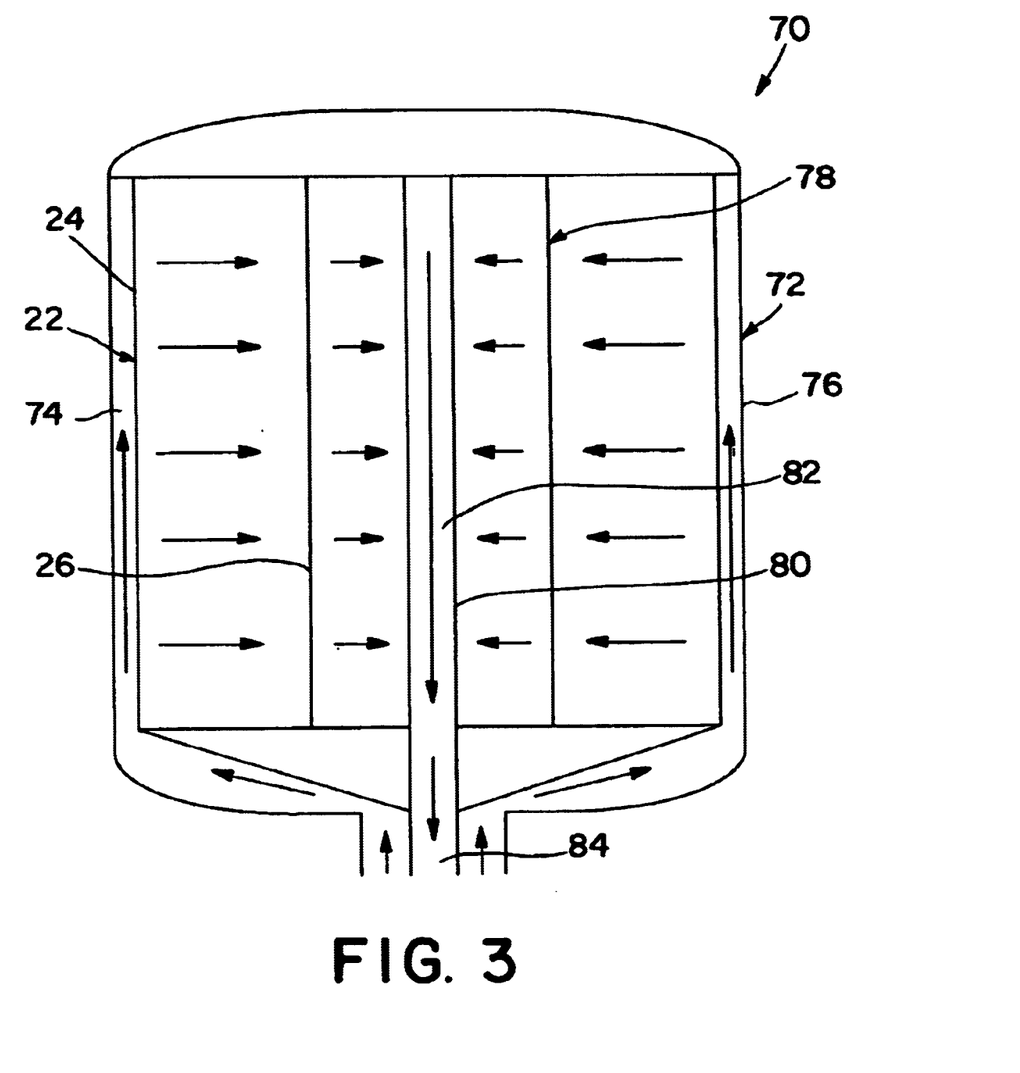
FIG. 3 is a schematic diagram of an apparatus of the invention that includes a vessel, an inner radial adsorption bed in the vessel and a second radial adsorption bed surrounding the inner radial adsorption bed.

Another embodiment of the invention is shown in FIG. 3, wherein apparatus 70 includes vessel 72. Within vessel 72 is radial adsorption bed 22, having outer porous wall 24 and inner porous wall 26, essentially as described above. Outer channel 74 is defined by site vessel wall 76 and outer porous wall 24, essentially as described above. Inner radial adsorption bed 78 extends from inner porous wall 26 to second inner porous wall 80. The inner diameter of inner radial adsorption bed 78 defines inner channel 82 which is in fluid communication with outlet 84. In alternative arrangements, not shown, the inner radial adsorption bed is separated from the outer adsorption bed by an annular space.

During operation a gas mixture is directed to channel 74 traverses radial adsorption bed 22, then, through porous wall 26, it traverses second radial adsorption bed 78. Inner radial adsorption bed 78 includes an adsorbent that can be the same or different from that employed in radial adsorption 22. Inner radial adsorption bed 78 can be employed to further purify or to remove a different component from the gas mixture.

Figure 4:
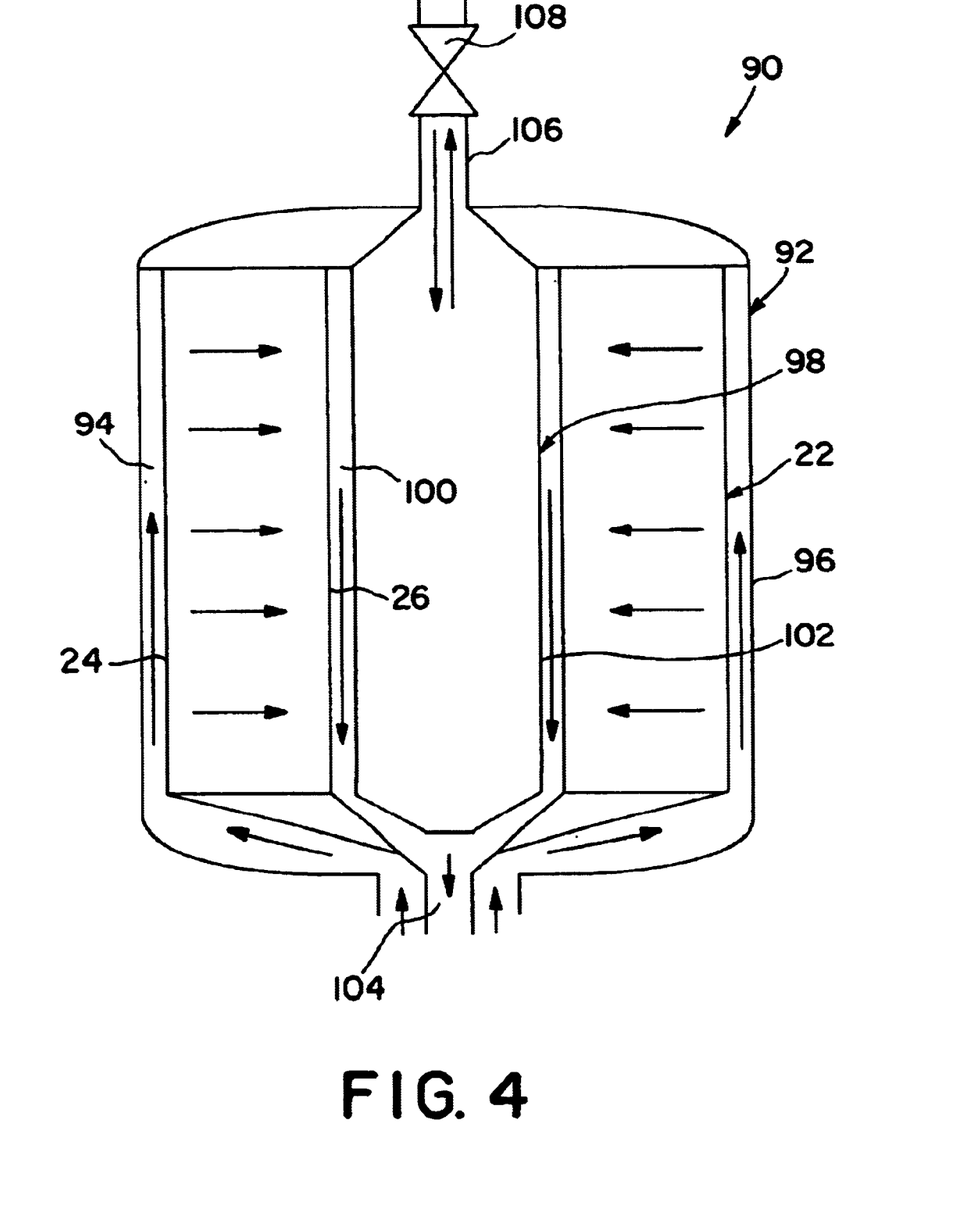
FIG. 4 is a schematic diagram of an apparatus of the invention that includes a vessel, a storage tank in the vessel and a radial adsorption bed surrounding the storage tank.

Another embodiment of the invention is described in relation to FIG. 4. Shown in FIG. 4 is apparatus 90 which includes vessel 92. Within vessel 92 is radial adsorption bed 22, having outer porous wall 24 and inner porous wall 26, essentially as described above. Outer channel 94 is defined by side vessel wall 96 and outer porous wall 24, essentially as described above. Storage tank 98 is within the inner diameter of radial adsorption 22. Inner channel 100 is defined by inner porous wall 26 and outer surface 102 of storage tank 98, and is in fluid communication with outlet 104. Storage tank 98 has access conduit 106 which is at the top of storage tank 98. Alternatively, access conduit 106 can be at the bottom of storage tank 98. Means 108, at access conduit 106 can be a shut-off valve, a metering valve or another suitable device known in the art.

In one embodiment, storage tank 98 is fabricated from rigid materials, for instance from steel, fiberglass or rigid polymeric materials, and provides a fixed storage volume. Such a tank can be designed to hold gas at pressure. In another embodiment, storage tank 98 is fabricated entirely or in part, from flexible, expandable material, such as, for example, rubber or another flexible material. Such a tank provides a variable storage volume and can be designed to store gas at a relatively low gauge pressure.

Storage tank 98 can be subdivided to accommodate different fluids. For example, the central void space can be divided longitudinally, horizontally, in a concentric arrangement or in another suitable manner. The volume of storage tank 98 also can be decreased by blocking off tank sections or by filling part of storage tank 98 with a solid material.

In another embodiment of the invention, not shown, both an adsorption zone and a storage tank are located within the space defined by inner porous wall 26 of radial adsorption bed 22. Vertical or horizontal dividers as well as concentric or other suitable arrangements can be employed.

During operation, means 108 can be closed to store a fluid, such as a gas or liquid, in storage tank 98 or can be opened to introduce the fluid into storage tank 98 or extract it therefrom. Storage tank 98 can be employed to store gas obtained or needed in the gas separation process conducted in radial adsorption bed 22. Another fluid, such as, for example, from a stream produced or needed in a process other than the process carried out in vessel 92, also can be housed in storage tank 98. For instance, in a multiple adsorption bed operation, product gas from another adsorption bed can be directed and stored in storage tank 98.

A VPSA system and process are described in U.S. Pat. No. 5,370,728, issued on Dec. 6, 1994, to LaSala, et al., the teachings of which are incorporated herein by reference in their entirety. The VPSA system includes one adsorbent bed and two external tanks referred to, respectively, as an equilization tank and a product surge tank. The VPSA process described in the LaSala, et al. patent includes five steps. Described with respect to an air separation application, the VPSA process includes pressurization with air of a partially pressurized bed. During this step, nitrogen is adsorbed and product oxygen, not adsorbed, is supplied to the product surge tank. In the second step, the adsorption bed is partially depressurized of void gas (oxygen enriched) which is collected in the equalization tank. The adsorption bed is evacuated in a third step, during which nitrogen (waste product) is desorbed from the adsorbent. In the fourth step the bed is purged using product gas (oxygen) from the product surge gas. In the fifth step the vessel is partially pressurized using void gas (oxygen enriched) from the equalization tank.

Figure 5:
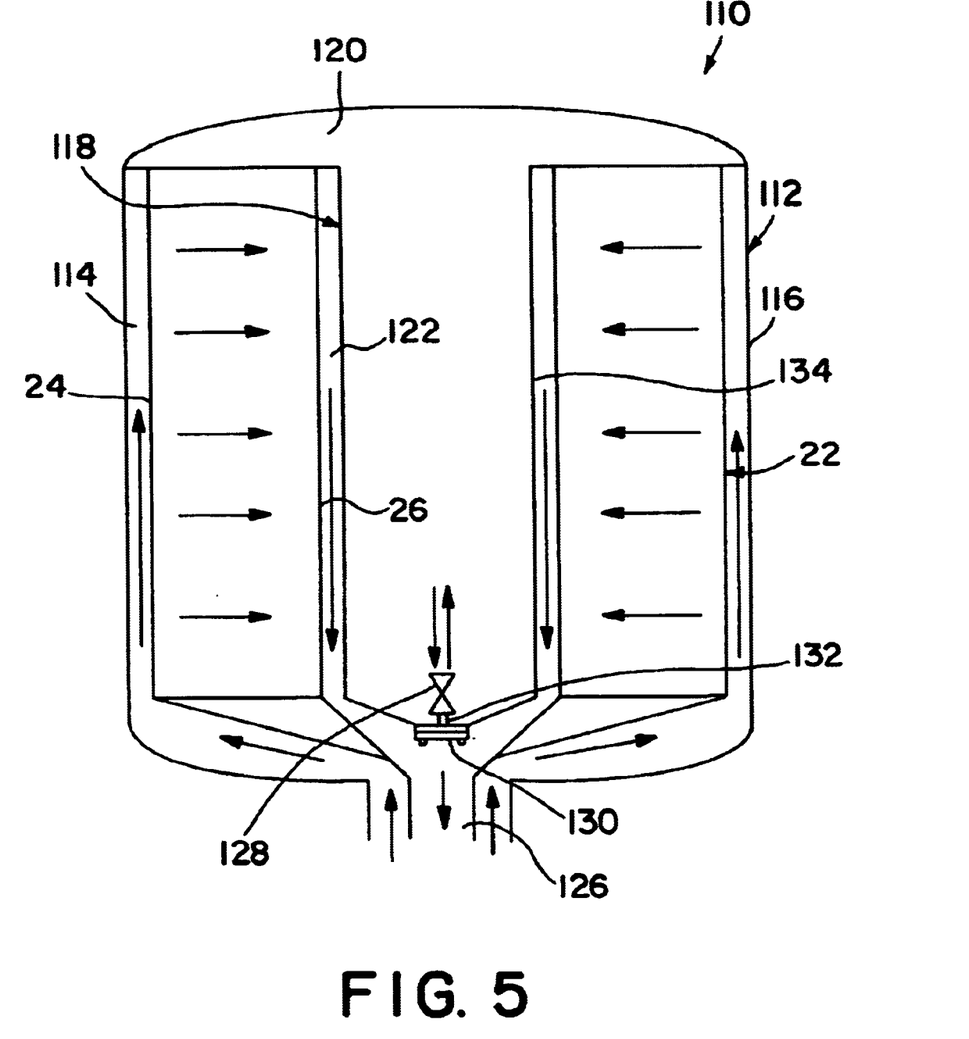
FIG. 5 is a schematic diagram of an apparatus of the invention that includes a vessel, a storage tank within the vessel for storing void, waste, product gas generated in a radial adsorption bed surrounding the storage tank.

The process described above can be conducted in apparatus 110 shown in FIG. 5. Apparatus 110 includes vessel 112. Vessel 112 contains radial adsorption bed 22 having outer porous wall 24 and inner porous wall 26, essentially as described above. Outer channel 114 is defined by side vessel wall 116 and outer porous wall 24, essentially as described above. Vessel 112 also includes storage tank 118. Additional storage is obtained by an open top head configuration in which upper region 120 of storage tank 118 contributes to the overall storage volume. If less storage volume is desired, upper region 120 can be partitioned off. Inner channel 122 is defined between inner porous wall 26 and outer surface 124 of storage tank 118 is in fluid communication with outlet 126.

In a preferred embodiment, storage tank 118 is employed as an equalization tank to store void gas. In another preferred embodiment, storage tank 118 is employed as a product surge tank to store product gas.

For instance, during the VPSA process described above, void gas or, alternatively, product gas is directed to, stored and extracted from storage tank 118 via valve assembly 128 which is mounted on flange 130 via piping 132. A blind flange with a hole tapped through it, to allow for installation of piping 132 and valve assembly 128 can be employed. For easy maintenance, flange 130 preferably is sized so that it can be inserted and removed through outlet 126 and valve assembly 128 preferably is sized so that it can be inserted and removed through the opening in flange 130. Outlet 126 can be closed of by means, not shown, known in the art. During operation, valve assembly 128 can be opened and outlet 126 can be closed off, thereby directing product or void gas to and from storage tank 118 to radial adsorption bed 22.

Figure 6:
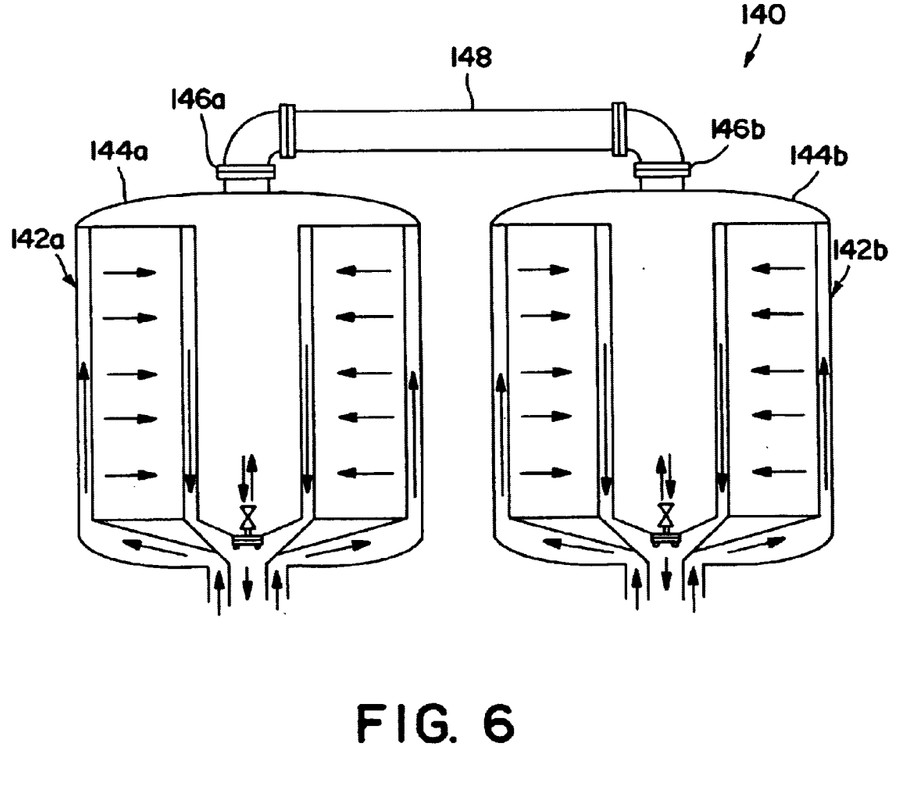
FIG. 6 is a schematic diagram of an apparatus of the invention including two vessels connected to one another.

Another embodiment of the invention is shown in FIG. 6. Shown in FIG. 6 is apparatus 140 which includes two vessels, 142a and 142b; each essentially is as described in relation to FIG. 5. Top vessel walls 144a and 144b are adapted, for example via flange arrangements 146a and 146b, such as known in the art, to connect the ends of conduit 148, thereby increasing the total storage volume. More than two vessels can be connected to one another, essentially as described above. In another arrangement, not shown, a vessel which includes a radial adsorption bed surrounding a storage tank, such as described above, is connected to a conventional storage tank.

An apparatus for conducting a gas separation process employing two storage tanks, contained in vessels such as described above, is shown in FIG. 7 wherein apparatus 150 includes vessels 152a and 152b, essentially as described above. Vessels 152a and 152b include, respectively, radial adsorption beds 22a and 22b, and storage tanks 154a and 154b.

Storage tanks 154a and 154b have a variable volume, as described above, and are each provided with valve assembly 156a and 156b. Valve assemblies 156a and 156b are essentially as described above, with respect to FIG. 5. In the embodiment shown in FIG. 7, storage tanks 154a and 154b are used to store a portion of waste gas. In alternative embodiments, storage tanks internal to radial adsorption beds 22a and 22b can be used to store product gas.

Figure 7:
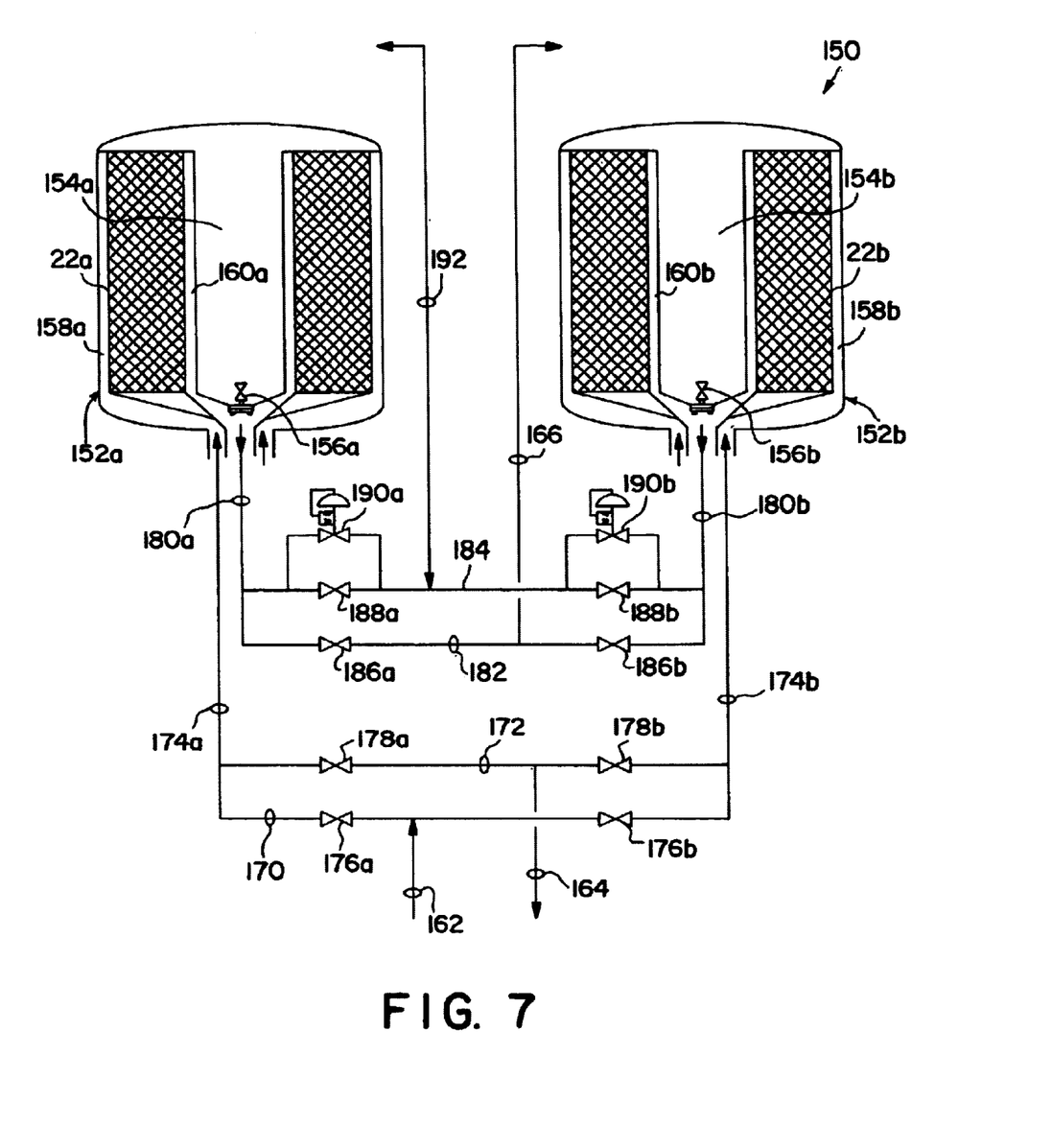
FIG. 7 is a schematic diagram of an apparatus of the invention including two vessels which can independently store gas and which are connected by a valve system.

Vessels 152a and 152b also have, respectively, outer channels 158a and 158b and inner channels 160a and 160b, as already described. Feed gas is directed to apparatus 150 via conduit 162 and product gas is collected from apparatus 150 via conduit 164. Waste gas exits apparatus 150 via conduit 166.

Conduit 162 is connected to outer channels 158a and 158b via conduits 170 and 172, which have a parallel arrangement with respect to one another, and through conduits 174a and 174b. Conduit 170 is provided with valves 176a and 176b and conduit 172 is provided with valves 178a and 178b.

Storage tanks 154a and 154b are connected to one another via conduits 180a and 180b, 182 and 184; conduits 182 and 184 are in a parallel arrangement with respect to one another. Storage tanks 154a and 154b are used to store a portion of waste gas. An external tank, not shown in FIG. 7, is employed to store product $CO_2$. In other embodiments, storage tanks 154a and 154b can be employed to store product gas while one or more external tanks can be employed to store waste $N_2$ gas. Conduit 182 is provided with valves 186a and 186b. Conduit 184 is provided with valves 188a and 188b and control valves 190a and 190b. Conduit 182 also is connected to conduit 166. Conduit 184 is connected to an external waste or void gas storage tank, not shown in FIG. 7, via conduit 192.

In one embodiment of the invention, apparatus 150 is employed to separate carbon dioxide ($CO_2$) from a feed stream, e.g., a mixture of $CO_2$ and nitrogen ($N_2$) In this embodiment, $CO_2$ is adsorbed in radial adsorption beds 22a and 22b and is collected as product gas, while $N_2$ is not adsorbed in radial adsorption beds 22a and 22b and exits apparatus 150 as waste gas.

FIGS. 8A–8E represent schematically steps of one cycle of one embodiment of the method of the invention. While the same steps are conducted in both vessels 152a and 152b, the steps in vessel 152b are offset with respect to the steps in vessel 152a and the flow of feed gas is continuous.

Figure 8A:
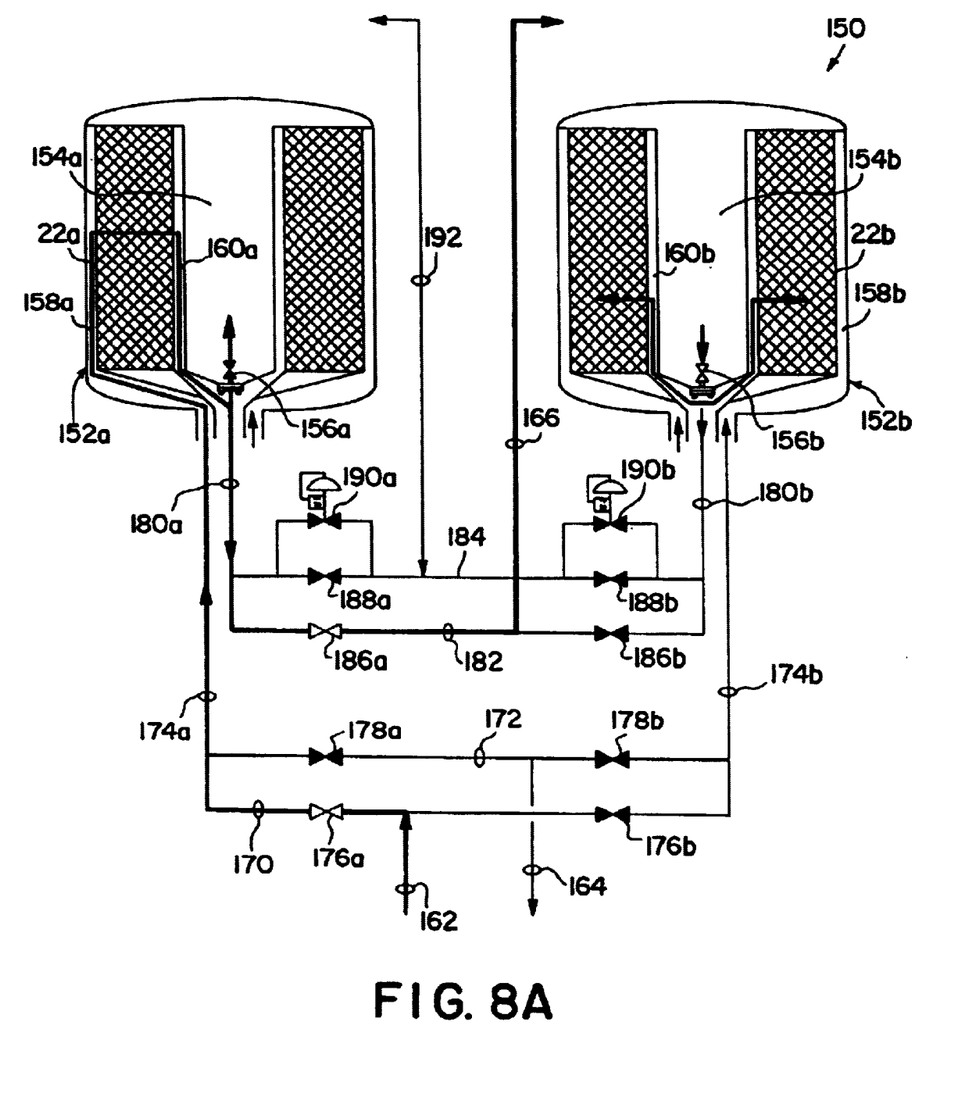
FIGS. 8A through 8E are schematic representations of the steps of one embodiment of the method of the invention.

In the first step, represented schematically in FIG. 8A, valves 178a, 188a and 190a are closed (filled valve symbols). Valve 176a is open (open valve symbol) and feed gas, e.g., a mixture of $CO_2$ and $N_2$, is directed to outer channel 158a via conduit 174a. $CO_2$ is adsorbed in radial adsorbent bed 22a and waste $N_2$ gas is collected from inner channel 160a, via conduit 180a through open valve 186a and exits apparatus 150 via conduit 166.

During a portion of this step, valve assembly 156a also is open and waste gas is stored, at low pressure, e.g., 0.0 to 2.0 pounds per square inch gauge (psig) in storage tank 154a. Once storage tank 154a is filled, valve assembly 156a is closed and the entire flow of waste gas is through conduit 180a, open valve 186a and conduit 166.

Meanwhile, valves 176b, 178b, 186b, 188b and 190b are closed. Waste $N_2$ gas stored in storage tank 154b in a previous cycle is used to re-pressurize radial adsorption bed 22b. Generally, the re-pressurizing is to a pressure of about 0.0 to 2.0 psig.

Figure 8B:
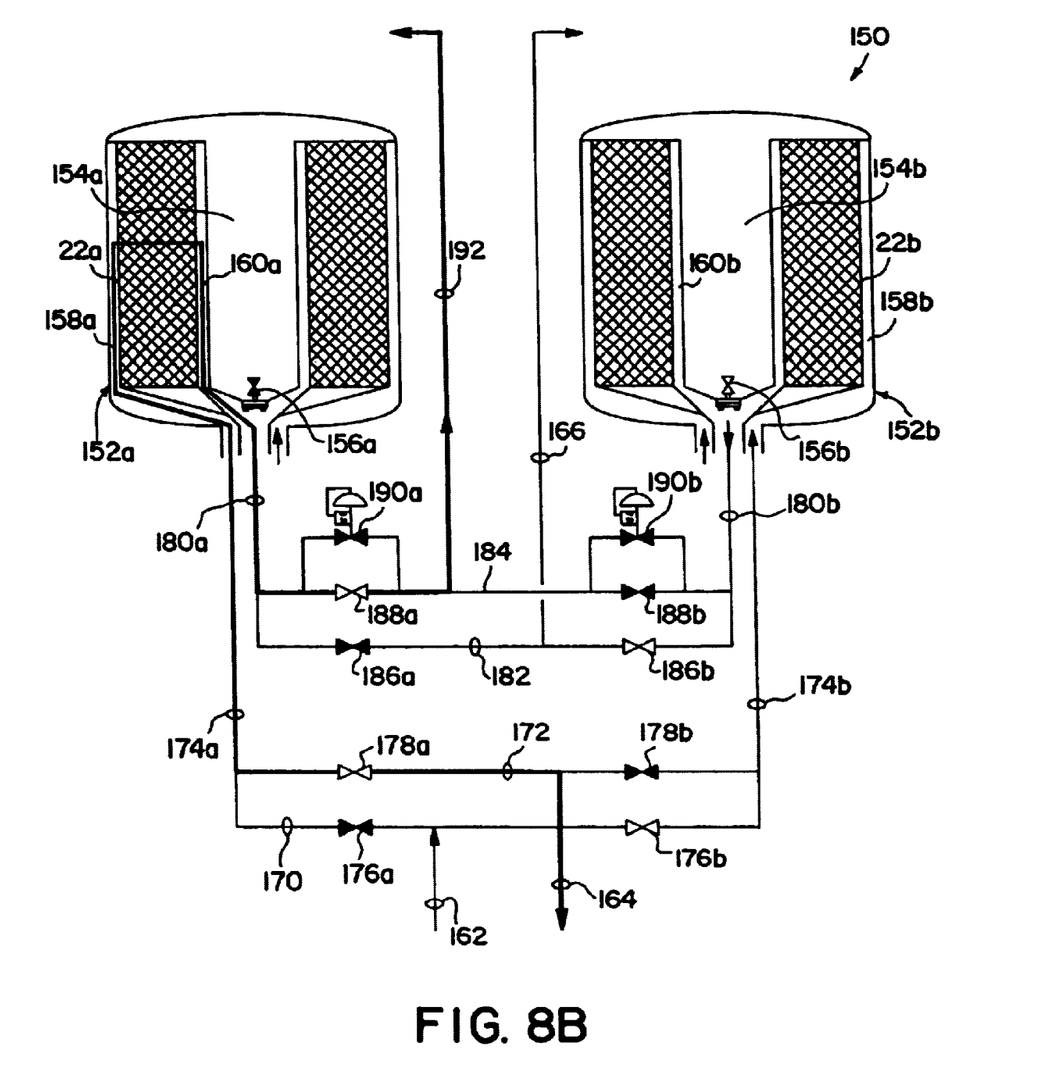

The second step, represented schematically in FIG. 8B, is initiated once radial adsorption bed 22a has been completely loaded with product gas. In this step, valves 176a, and 186a closed. Valves 178a and 188a are open and radial adsorption bed 22a undergoes a rapid pressure reduction. Mainly void gas flows out via conduit 180a to an external storage tank, not shown in FIG. 8B, via conduit 192. By applying a vacuum source, not shown, such as a pump, first void gas, then product $CO_2$ also flows via open valve 178a and is collected from apparatus 150 through conduit 164.

Meanwhile, feed gas stream is directed to vessel 152b, via open valve 176b and waste $N_2$ gas exits vessel 152b via open valve 186b. Valves 178b, 188b and 190b are closed. For a portion of this step, assembly valve 156b is open, allowing a portion of waste gas to be stored in storage tank 154b.

Figure 8C:
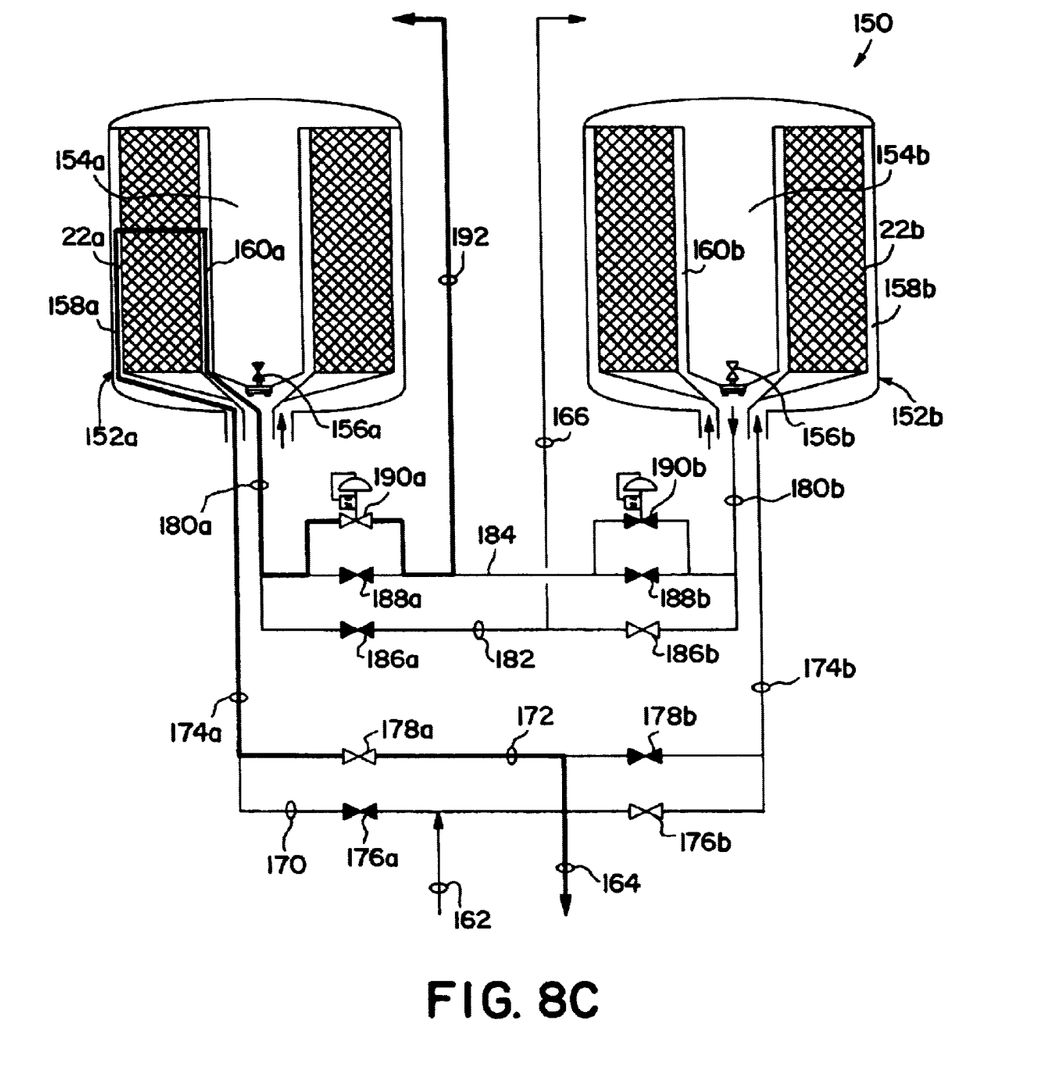

In the third step, represented schematically in FIG. 8C, product continues to be collected from vessel 152a, as valve 178a remains open to the vacuum source. Valves 176a, 186a and 188a are closed. Control valve 190a is closed until the bed pressure reaches a set level, for example, 0.5 to 2.0 pounds per square inch absolute (psia), after which control valve 190a is adjusted to maintain the set pressure level.

No changes are made with respect to vessel 152b which remains in the $CO_2$ adsorption mode. Feed gas continues to be supplied, via outer channel 158b to radial adsorption bed 22b. Valves 178b, 188b and 190b remain closed. Waste $N_2$ gas continues to be collected from inner channel 160b, via conduit 180b and to be exhausted from vessel 152b via conduit 166.

The fourth step is initiated once all $CO_2$ has been desorbed from radial adsorption bed 22a. In the fourth step, represented schematically in FIG. 8D, radial adsorption bed 22a is partially re-pressurized in preparation for the next adsorption cycle. Valves 176a, 178a, 186a and control valve 190a are closed. To equilibrate vessel 152a, valve 188a is open and allows gas stored in the external tank, not shown in FIG. 7, to be directed, via conduit 192, back to vessel 152a, thereby raising the bed pressure in vessel 152a, e.g., to about 1.0 to 5.0 psia, while decreasing the pressure in the external tank.

Figure 8D:
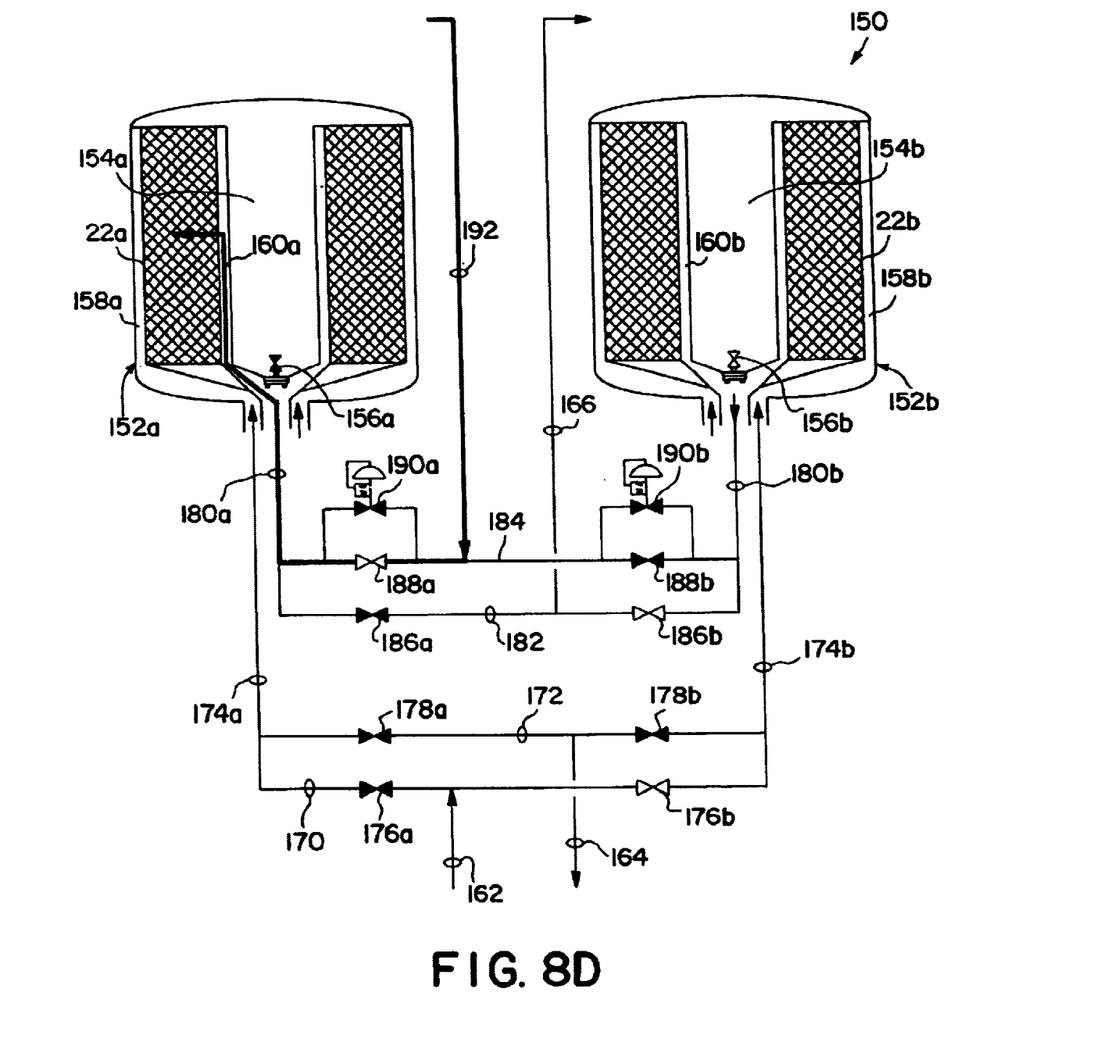

During this step, valves 178b, 188b and control valve 190b are maintained in the closed position and feed stream continues to be directed to vessel 152b via open valve 176b, while waste $N_2$ waste gas continues to be exhausted from vessel 152b via open valve 186b and conduit 166.

Figure 8E:
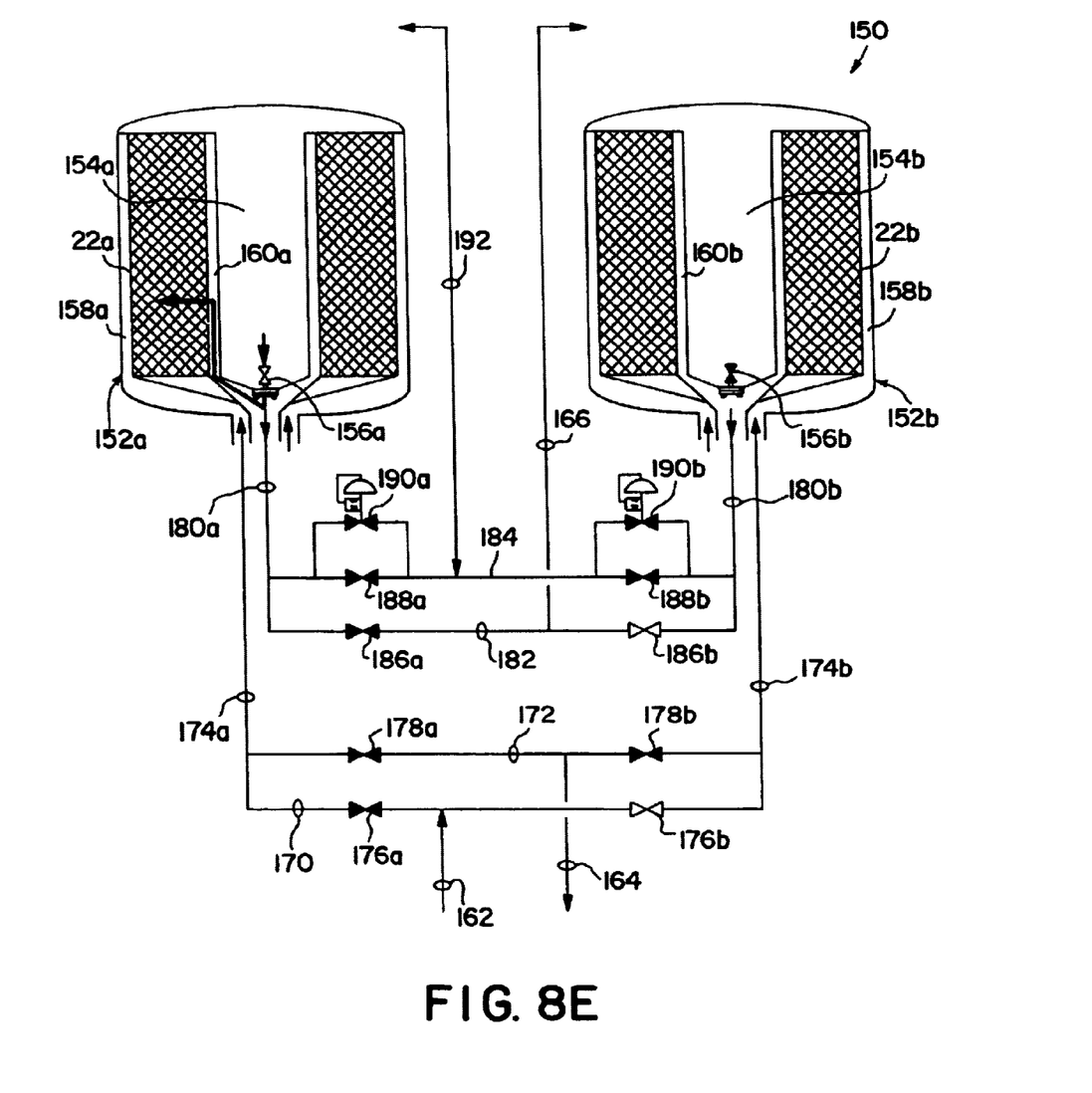

In the fifth step, represented schematically in FIG. 8E, valves 176a, 178a, 186a, 188a and 190a are closed. Valve assembly 156a is opened and waste $N_2$ gas, stored in storage tank 154a during the first step, is employed to re-pressurize radial adsorption bed 22a to the feed pressure, e.g., 0.0 psig to 2.0 psig. Radial adsorption bed 22a is now ready for step one and the entire cycle can be repeated.

Meanwhile, feed gas stream continues to be supplied to vessel 152b via open valve 176b. Waste $N_2$ gas is exhausted via open valve 186b and exits apparatus 150 through conduit 166.

EQUIVALENTS

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for separating a product gas from a gas mixture, comprising the steps of:
    a) directing a gas mixture across a radial adsorption bed, thereby causing at least a portion of a gas component of the gas mixture to be adsorbed by the radial bed and producing partially purified gas; and
    b) directing partially purified gas through an inner adsorption bed, thereby causing further purification of the partially purified gas and producing a product gas,
wherein the radial adsorption bed surrounds the inner adsorption bed.

2. A method for separating a product gas from a gas mixture, comprising the steps of:
    a) directing a gas mixture across a radial adsorption bed, thereby causing at least a portion of a gas component of the gas mixture to be adsorbed by the radial bed; and
    b) directing partially purified gas, product gas, or waste gas from the radial adsorption bed to a tank,
wherein the radial adsorption bed surrounds the tank.

3. A method for conducting a gas separation process comprising the steps of:
    a) directing a mixture comprising a gas component to a radial adsorption bed, thereby adsorbing the gas component and generating a waste gas;
    b) storing a portion of said waste gas to a storage tank; depressurizing the radial adsorption bed, thereby releasing adsorbed gas component; and
    c) directing waste gas stored in the storage tank to the radial adsorption bed, thereby re-pressurizing the radial adsorption bed,
wherein the radial adsorption bed surrounds the storage tank.

4. A gas separation apparatus, comprising:
    a) a vessel having a vessel side wall;
    b) an axial adsorption bed within the vessel, said adsorption bed having an outer surface; and
    c) a radial adsorption bed surrounding the axial adsorption bed, said radial adsorption bed having an inner porous wall and an outer porous wall,
wherein an inner channel is defined by the outer surface of the axial adsorption bed and the inner porous wall of the radial adsorption bed, and an outer channel is defined by the outer porous wall of the radial adsorption bed and the vessel side wall.

5. The apparatus of claim 4 wherein the inner channel is in fluid communication with the axial adsorption bed.

6. The apparatus of claim 4 further comprising means for directing feed gas to the outer channel.

7. The apparatus of claim 4 further comprising means for collecting gas from the axial adsorption bed.

8. The apparatus of claim 4 wherein the axial adsorption bed includes a first adsorbent material and the radial adsorption bed includes a second adsorbent material.

9. The apparatus of claim 8 wherein the first and the second adsorbent materials are the same type of materials.

10. The apparatus of claim 4 wherein the radial bed has an outer diameter of 16 feet or less.

11. A gas separation apparatus, comprising:
 a) a vessel having a side wall;
 b) an inner radial adsorption bed within the vessel having an inner diameter which defines an inner channel; and
 c) an outer radial adsorption bed surrounding the inner radial adsorption bed, said outer radial adsorption bed having an inner porous wall and an outer porous wall, wherein an outer channel is defined by the outer porous wall and the vessel side wall.

12. The gas separation apparatus of claim 11 wherein the inner radial adsorption bed extends to the inner porous wall.

13. The gas separation apparatus of claim 11 wherein the inner adsorption bed is separated from the inner porous wall by an annular space.

14. A gas separation apparatus, comprising:
 a) a vessel having a side wall;
 b) a storage tank within the vessel; and
 c) a radial adsorption bed surrounding the storage tank, said radial adsorption bed having an inner porous wall and an outer porous wall,
wherein an inner channel is defined by the storage tank and the inner porous wall and an outer channel is defined by the outer porous wall and the vessel side wall.

15. The apparatus of claim 14 further comprising means for directing gas from the radial adsorption bed to the storage tank.

16. The apparatus of claim 14 further comprising means for directing gas from the storage tank to the radial adsorption bed.

17. The apparatus of claim 14 further comprising a second storage tank and a conduit connecting the storage tank to the second storage tank.

18. The apparatus of claim 14 wherein the storage tank has a fixed volume.

19. The apparatus of claim 14 wherein the storage tank has a variable volume.

20. The apparatus of claim 14 wherein the storage tank is fabricated of steel.

21. The apparatus of claim 14 wherein the storage tank is fabricated of a flexible material.

22. The apparatus of claim 14 wherein the central storage tank contains product gas from a gas separation process conducted in the vessel.

23. The apparatus of claim 14 wherein the central storage tank contains waste gas from a gas separation process conducted in the vessel.

\* \* \* \* \*